US008118071B2

(12) United States Patent
Sued et al.

(10) Patent No.: US 8,118,071 B2
(45) Date of Patent: Feb. 21, 2012

(54) PENCIL SHARPENER

(76) Inventors: Charles Sued, Brooklyn, NY (US); Aron Abramson, Brooklyn, NY (US)

( * ) Notice: Subject to any disclaimer, the term of this patent is extended or adjusted under 35 U.S.C. 154(b) by 0 days.

(21) Appl. No.: 12/938,035

(22) Filed: Nov. 2, 2010

(65) Prior Publication Data

US 2011/0041956 A1 Feb. 24, 2011

Related U.S. Application Data

(63) Continuation of application No. 12/360,368, filed on Jan. 27, 2009.

(51) Int. Cl.
*B43L 23/00* (2006.01)
*B23Q 15/00* (2006.01)

(52) U.S. Cl. ......... 144/356; 144/421; 144/427; 144/391

(58) Field of Classification Search .................. 144/356, 144/382, 391, 402–404, 421, 427, 28.1–28.72; 30/453, 454, 457–459
See application file for complete search history.

(56) References Cited

U.S. PATENT DOCUMENTS 3,134,365 A * 5/1964 Hori .............................. 144/28.5
3,556,182 A * 1/1971 Tanigami ...................... 144/28.5
3,650,308 A * 3/1972 Hori .............................. 144/28.5
3,678,975 A * 7/1972 Imanishi et al. ............. 144/28.5
4,601,316 A * 7/1986 Verdi .......................... 144/28.72
7,913,731 B2 * 3/2011 Sued et al. .................... 144/356

FOREIGN PATENT DOCUMENTS

JP 2008137206 * 6/2006

* cited by examiner

*Primary Examiner* — Shelley Self
(74) *Attorney, Agent, or Firm* — Garcia-Zamor IP Law; Ruy M. Garcia-Zamor

(57) ABSTRACT

A pencil sharpener that facilitates the sharpening of pencils by any one or more of the following: preventing injury; automatically sharpening pencils without manual manipulation; providing status indicators during sharpening; and/or allowing varying degrees of sharpness to be selected.

9 Claims, 8 Drawing Sheets

PENCIL SHARPENER

CROSS REFERENCE TO RELATED APPLICATION

This application claims benefit of and priority to U.S. patent application Ser. No. 12/360,368, filed on Jan. 27, 2009, entitled "Pencil Sharpener", invented by Charles Sued and Aron Abramson, and is hereby incorporated by reference herein as if set forth in its entirety.

BACKGROUND

The present invention is generally directed to pencil sharpeners and, more specifically, to an automated pencil sharpener.

Conventional pencil sharpeners are difficult to operate and require monitoring and/or manipulation by a user. It would be advantageous to provide a pencil sharpener that simplifies and/or facilitates the sharpening of pencils.

SUMMARY

Briefly speaking, one embodiment of the present invention is directed to an automatic pencil sharpener including a housing defining a bore configured to receive a pencil therein. A selectable control is configured to allow selection of a degree of sharpness to which the pencil will be sharpened. A cutting mechanism is disposed in the housing and is adapted to sharpen the pencil in the bore. The cutting mechanism is configured to sharpen the pencil to any one of a plurality of degrees of sharpness depending on the selectable control. Wherein the cutting mechanism is configured to secure the pencil inserted in the bore, automatically advance the pencil during the sharpening thereof, and then to at least partially eject the pencil after sharpening. The automatic pencil sharpener is adapted for a pencil to be placed in the bore to be automatically sharpened and at least partially ejected without manual manipulation of the pencil during sharpening and at least partial ejection.

In a separate aspect, one embodiment of the present invention is an automatic pencil sharpener including a housing defining a bore configured to receive a pencil therein. A cutting mechanism is disposed in the housing and is adapted to sharpen the pencil in the bore. The cutting mechanism is configured to secure the pencil inserted in the bore, automatically advance the pencil during the sharpening thereof, and then to at least partially eject the pencil after sharpening. A sensor is positioned proximate the bore to detect a portion of a person's body. A controller is in communication with the sensor and the cutting mechanism. When the sensor determines a portion of a person's body is touching a portion of the housing proximate to the bore, the controller stops the cutting mechanism to prevent injury. The automatic pencil sharpener is adapted for a pencil to be placed in the bore to be automatically sharpened and at least partially ejected without manual manipulation thereof.

In a separate aspect, one embodiment of the present invention is directed to a method of automatically sharpening a pencil. The method includes: providing a housing defining a bore adapted to receive the pencil for automatic sharpening; selecting a degree of sharpness to which to sharpen the pencil; inserting the pencil into the bore; automatically advancing the pencil without requiring manual manipulation to sharpen the pencil; automatically sharpening the pencil to one of a plurality of degrees of sharpness; and automatically at least partially ejecting the pencil after the completion of the sharpening operation.

In another aspect, one embodiment of the present invention is directed to a method of automatically sharpening a pencil. The method including: providing a housing defining a bore adapted to receive the pencil for automatic sharpening; automatically monitoring the housing proximate the bore to detect a portion of a person's body and stopping the sharpening operation to prevent injury if the portion of the person's body is detected.

BRIEF DESCRIPTION OF THE DRAWINGS

The following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Figure 1:
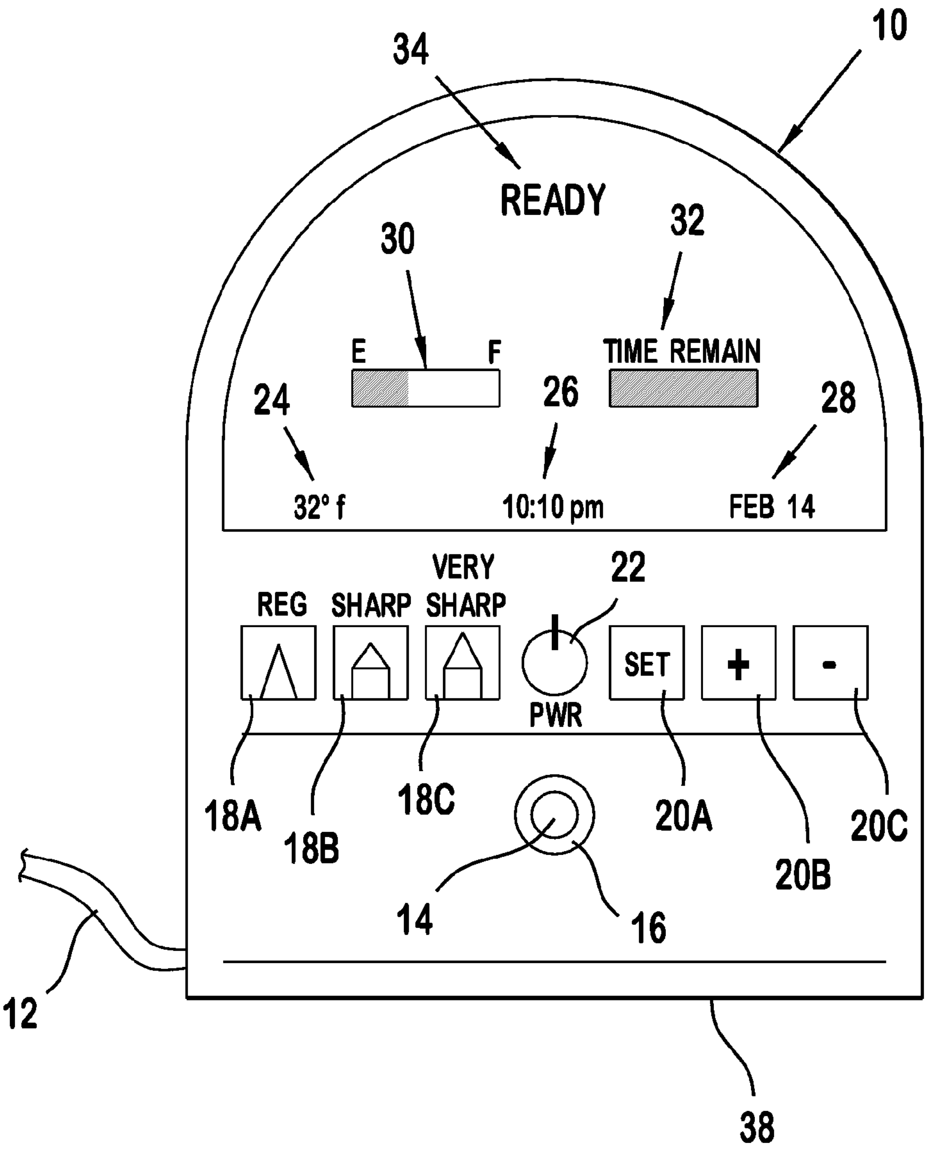
FIG. 1 is a front elevational view of a pencil sharpener according to a preferred embodiment of the present invention; The pencil sharpener preferably includes an LCD screen with a status indicator that may indicate "READY" when the pencil sharpener is ready to operate; The pencil sharpener can include any one or combination of time, date, and temperature indicators; The pencil sharpener preferably includes a pencil shavings bin gauge that illustrates how close to full is the bin; A countdown timer may also be included that alerts a user as to how much time remains for a pencil sharpening operation to be completed; The pencil sharpener preferably includes selectable sharpness controls to allow a user to select whether pencils should be sharpened to a regular, sharp, or very sharp point; Similarly, the sharpener may include selectable variable sharpness controls that allow the amount of sharpness to be varied in small increments; The sharpener may use a power conduit, be powered by batteries, or use any suitable power source; The pencil sharpener preferably automatically secures a pencil during the sharpening process to prevent a user from having to push the pencil inwardly during sharpening; A light may be located around the bore into which the pencil is loaded; This automates the process and allows a user to simply load the pencil and then attend to other matters.

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the pencil sharpener and designated parts thereof. The term "control", as used in the claims and the corresponding portions of the specification, means "any one of a physical switch, a touch switch, a button, a voice activated switch, a control knob, a remote control switch, or any other known operating mode selection device". The term "activated state", as used with selectable control, means that the selectable control has been manipulated so that the selectable control is set for a particular function. For example, if the selectable control is a simple switch, then the activated state may be having the switch turned to another position and if the selectable control is a touch sensor, then the activated state may be initiated by depressing or touching the sensor in a predetermined manner. The language "at least one of 'A', 'B', and 'C'," as used in the claims and in corresponding portions of the specification, means "any group having at least one 'A'; or any group having at least one 'B'; or any group having at least one 'C';—and does require that a group have at least one of each of 'A', 'B', and 'C'." Additionally, the words "a" and "one" are defined as including one or more of the referenced item unless specifically stated otherwise. The terminology includes the words above specifically mentioned, derivatives thereof, and words of similar import.

Referring to FIGS. 1-9, wherein like numerals indicate like elements throughout, there are shown preferred embodiments of a pencil sharpener 10. Briefly speaking, the pencil sharpener 10 preferably allows a user to automatically sharpen a pencil 54 without holding or pushing the pencil 54 during the sharpening operation. The pencil sharpener 10 is preferably adapted for a pencil 54 placed in the bore 14 to be automatically sharpened and at least partially ejected without further manual manipulation of the pencil 54 during sharpening and at least partial ejection. The pencil sharpener 10 may be configured to allow a user to select the degree of sharpness to which the pencil 54 is sharpened. It is preferable that the sharpener 10 is configured to allow any one of at least two degrees of sharpness to be selected for the pencil 54 to be inserted into the bore 14. The pencil sharpener 10 may include a pencil shavings bin full indicator/gauge 30 and/or may include a time remaining indicator 32 to indicate the remaining time until completion of a sharpening operation. The pencil sharpener 10 is preferably configured to automatically stop any sharpening operation if a portion of a person's body touches the sharpener 10 proximate the bore 14 that receives the pencil 54. The pencil sharpener 10 can be configured to automatically secure the pencil 54 when it is inserted in the bore 14 so that the pencil 54 can be sharpened without a user having to hold or push the pencil 54. It is also preferred that the pencil sharpener 10 automatically eject the pencil 54 at the completion of the pencil sharpening operation. Those of ordinary skill of the art will appreciate that the pencil sharpener 10 of the present invention may include any one or all of the above functions without departing from the scope of the present invention.

Figure 2:
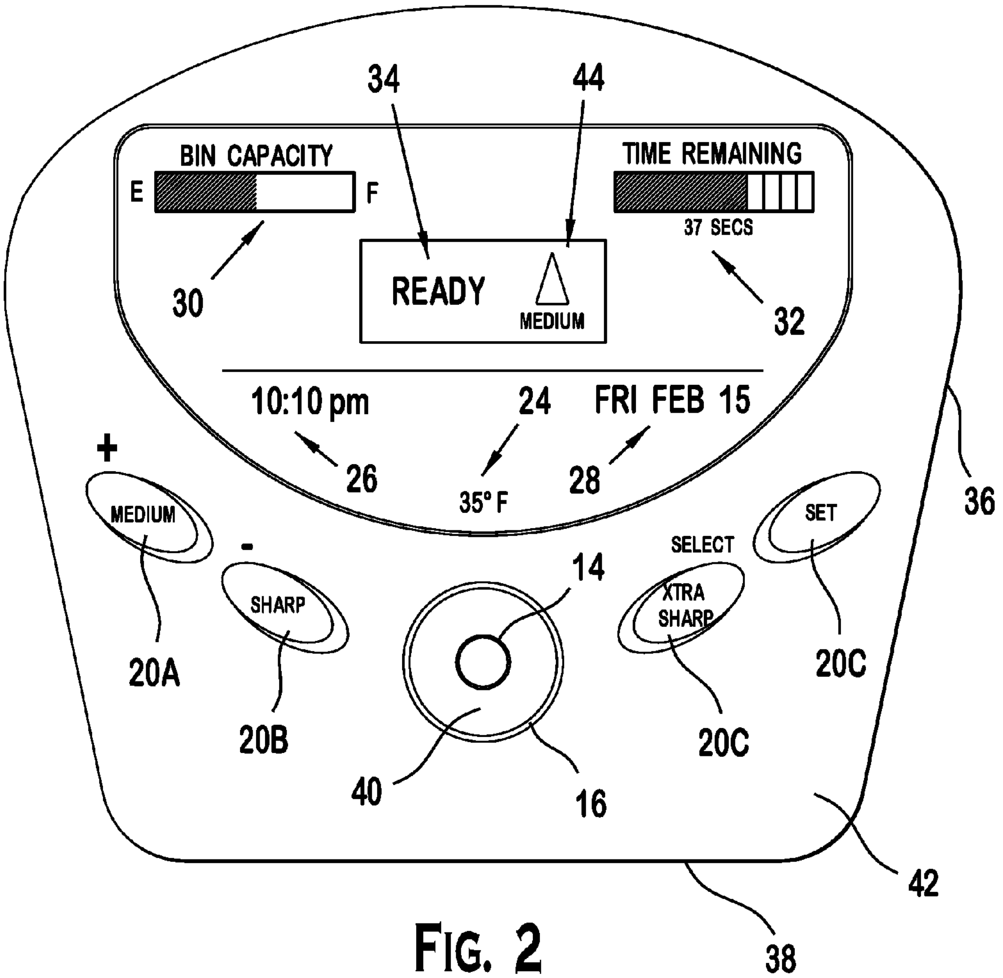
FIG. 2 is a front elevational view of a second preferred embodiment of the pencil sharpener according to the present invention; The sharpener may include a touch sensitive sensor that surrounds the bore to determine when a user's finger is too close to the bore; The touch sensitive sensor preferably deactivates the pencil sharpener cutting operation when it detects a portion of a person's body; The pencil sharpener preferably includes an LCD screen with a status indicator that may indicate "READY" when the pencil sharpener is ready to operate and which may include an identification of the current sharpness setting (in this case the sharpener is shown to be set for medium sharpness as shown by the icon to the right of the READY icon); The pencil sharpener can include any one or combination of time, date, and temperature indicators; The pencil sharpener preferably includes a pencil shavings bin gauge that illustrates how close to full is the bin; A countdown timer may also be included that alerts a user as to how much time remains for a pencil sharpening operation to be completed; The pencil sharpener preferably includes selectable sharpness controls to allow a user to select whether pencils should be sharpened to a medium, sharp, or very sharp point; Similarly, the sharpener may include selectable variable sharpness controls that allow the amount of sharpness to be varied in small increments; The pencil sharpener preferably automatically secures a pencil during the sharpening process to prevent a user from having to push the pencil inwardly during sharpening; A light may be located around the bore into which the pencil is loaded; This automates the process and allows a user to simply load the pencil and then attend to other matters.
Figure 3:
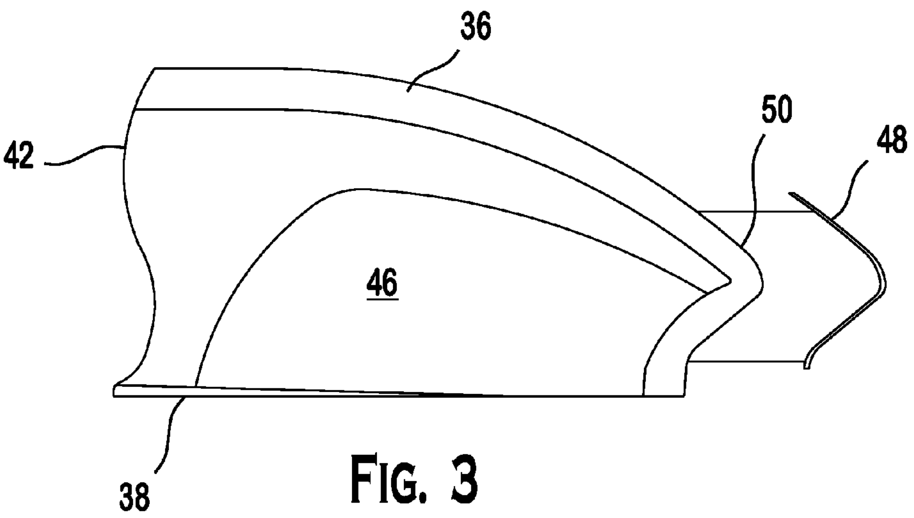
FIG. 3 is a side elevational view of the pencil sharpener of FIG. 2 illustrating the pencil shavings bin in an extended position; The pencil shavings bin preferably slidably retracts from the rear of the sharpener housing.

Referring to FIG. 1, one embodiment of the pencil sharpener 10 of the present invention includes a pencil sharpener housing 36. The housing 36 preferably defines at least one bore 14 for receiving a pencil to be automatically sharpened. The front of the housing preferably has a generally semicircular upper portion and a generally rectilinear lower portion to form a generally upside down "U". Referring to FIGS. 1-3, while preferred housings 36 have been shown, those of ordinary skill in the art will appreciate from this disclosure that the pencil sharpener housing 36 can have any shape without departing from the scope of the present invention.

The pencil sharpener 10 preferably receives power from an outlet via a power conduit, such as an electrical cord, 12. However, the pencil sharpener can be powered by batteries or any other suitable power source.

Referring to FIGS. 1 and 2, the pencil sharpener 10 preferably includes a selectable control 22, such as a power switch, that is in communication with the pencil sharpener 10 and has an activated state adapted to configure the pencil sharpener 10 to automatically grasp any pencil that is inserted into the bore 14 of the housing 36. A light 16 may be located around the bore into which the pencil 54 is loaded. The light 14 can be configured to blink once a pencil 54 has been sharpened and is ready for removal or can change colors depending on the stage of the sharpening operation. The light 14 is preferably disposed proximate to the bore 14 to give a visual alert when the sharpening process is complete. The light 14 can be, but is not necessarily, adapted to change at least one colors and illumination intensity to indicate the status of the sharpening process. For example the light 14 may be blue while the sharpener 10 is waiting for the pencil 54 to be loaded; change to red during sharpening; and change to green once the pencil 54 has been sharpened and the sharpening operation has ceased. Any combination of colors or illumination patterns may be used to indicate the status of a pencil sharpening operation without departing from the scope of the present invention. Additionally, audible indicators including a recorded voice can be used to indicate the status of a cutting operation.

Referring to FIG. 1, the pencil sharpener preferably includes an display, such as a liquid crystal display (LCD) or any other suitable display. It is preferably that the display include a countdown timer therein that represents the time for the sharpening process to be completed. Alternatively, light emitting diodes can be used to transmit information without departing from the scope of the present invention.

The display preferably includes a status indicator 34 that may indicate "READY" when the pencil sharpener is ready to operate. A selected sharpness indicator 44 (shown in FIG. 2) may also be displayed. The pencil sharpener 10 can include any one or combination of time, date, and temperature indicators, 26, 28, and 24 respectively. Additional parameters, such as remaining battery life, barometric pressure, etc. may also be displayed without departing from the scope of the present invention.

The pencil sharpener preferably includes a pencil shavings bin gauge 30 that illustrates how close to full is the pencil shavings bin 48. A sensor may be configured to determine when the pencil shavings bin is full and a display may indicate when the sensor detects a full pencil shavings bin. Referring to FIG. 3, the pencil shaving bin may be extendable from the rear 50 of the sharpener housing 36. The pencil sharpener 10 may be configured to automatically extend the bin 48 and halt sharpening operations when the bin 48 is full or just to activate an alarm or warning signal. The alarm or warning signal can be any one or combination of an audible alarm and a visual alarm. Alternatively, the bin 48 may auto open and close due to selection of a control (not shown). A countdown timer 32 may also be included in the pencil sharpener 10 that alerts a user as to how much time remains for a pencil sharpening operation to be completed. Any of the countdown timers, gauges, icons, buttons, controls, etc. that are discussed in this application and which may be illustrated in the drawings in connection with the pencil sharpener 10 can be varied or reconfigured using any suitable display, configuration, alarm, indicator, or mechanism to convey the necessary information or receive the necessary input without departing from the scope of the present invention.

The pencil sharpener 10 preferably includes selectable sharpness controls 18A, 18B, and 18C (also referred to as a "selectable control" or "selectable controls" in the claims) to allow a user to select whether pencils should be sharpened to a medium, sharp, or very sharp point. That is the selectable control 18A, 18B, and 18C may be configured to allow selection of the degree of sharpness to which a pencil is sharpened. For example only, the control 18A for a regular point may result in a pencil point having a central cross-sectional angle through the apex of approximately sixty degrees; the control 18B for a sharp point may result in a pencil point having a central cross-sectional angle through the apex of approximately forty degrees; and the control 18C for a very sharp point may result in a pencil point having a central cross-sectional angle through the apex of approximately thirty degrees. Similarly, the sharpener 10 may include selectable variable sharpness controls 20A, 20B, and 20C that allow the amount of sharpness to be varied in increments. Those of ordinary skill in the art will appreciate from this disclosure that the degree of sharpness can be varied along with the possible incremental adjustment without departing from the scope of the present invention.

Figure 4:
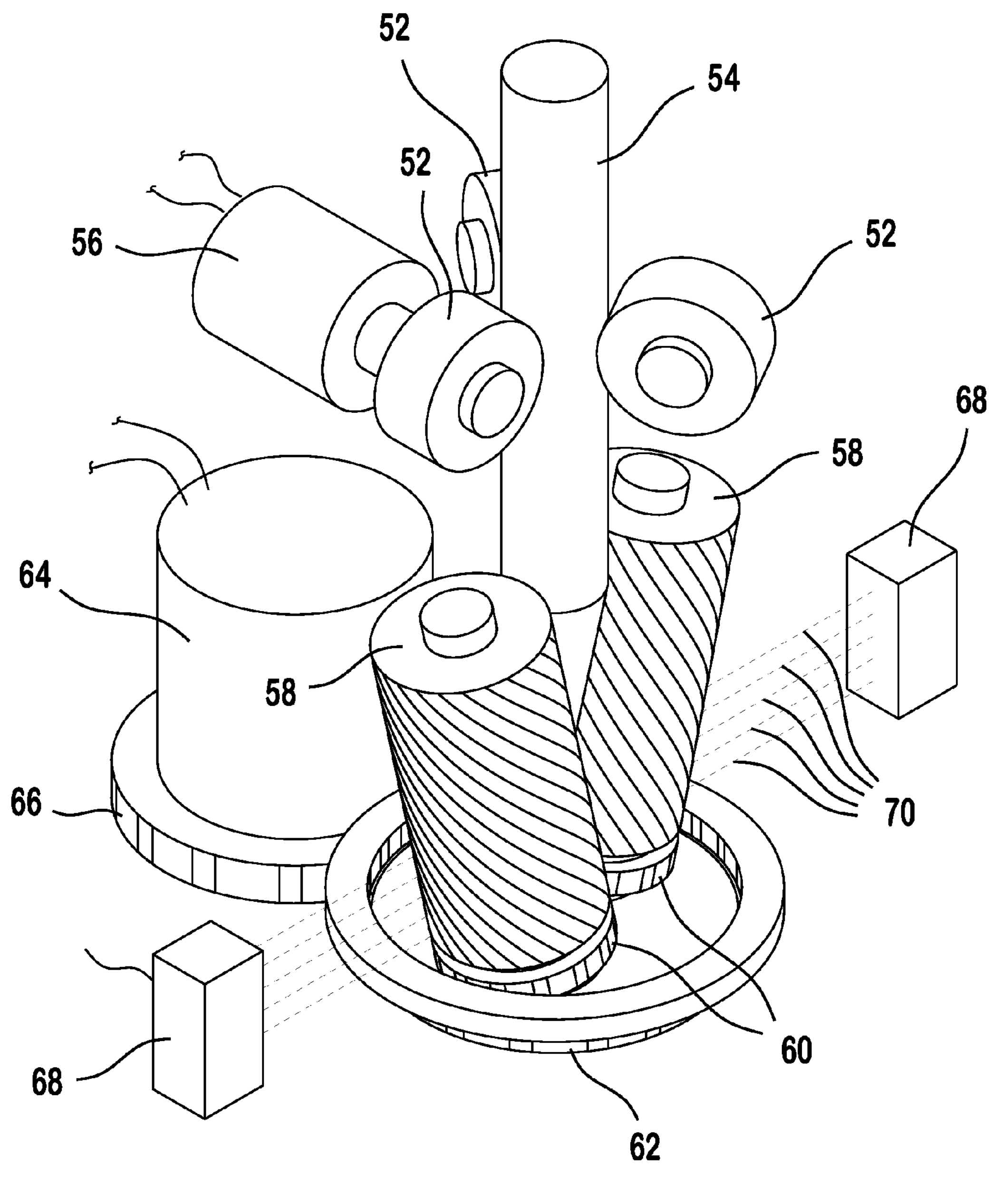
FIG. 4 is a perspective view of one type of cutting mechanism that may be used with any embodiment of the pencil sharpener of the present invention; This cutting mechanism may use a single set of paired cutters to sharpen pencils to varying degrees as desired; Polymer wheels are preferably spring loaded to grasp a pencil once it is inserted into the sharpener; At least one of the wheels is driven by a wheel motor to adjust the pencil position; The pencil is guided to the paired cutters that sharpen the pencil; A cutting motor is linked to the paired cutters via gears; A sensor that uses multiple light beams may be used to monitor how far into the paired cutters the pencil has been driven which allows the level of sharpness to be controlled; Alternatively, the wheel motor may be a step motor that moves the pencil an incremental distance depending on the desired level of sharpness.
Figure 5:
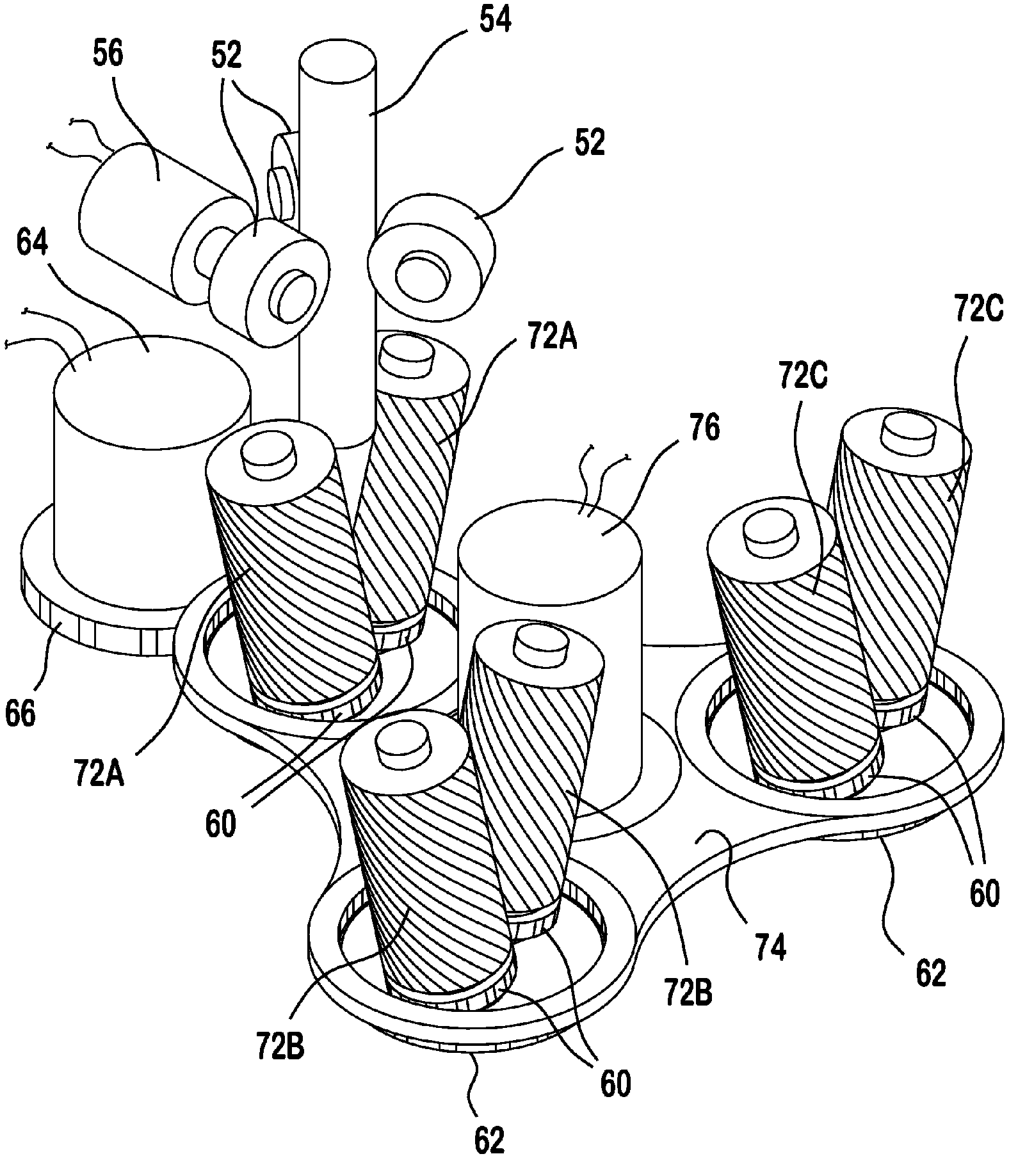
FIG. 5 is a perspective view of another type of cutting mechanism that may be used with any embodiment of the pencil sharpener of the present invention; This cutting mechanism may use multiple sets of paired cutters to sharpen pencils to varying degrees as desired; Polymer wheels are preferably spring loaded to grasp a pencil once it is inserted into the sharpener; At least one of the wheels is driven by a wheel motor to adjust the pencil position; The paired cutters are preferably arranged in pairs on a carousel and configured to provide different degrees of sharpening; The carousel may be driven by a carousel motor; The pencil is guided to the paired cutters that are aligned therewith by the carousel; The cutting motor is linked to the paired cutters that will sharpen the pencil; Each of the paired cutters may be linked to a separate gear that is engaged with the cutter gear when the paired cutters are moved into position for use in a sharpening operation; A sensor (not shown) that uses multiple light beams may also be used to monitor how far into the paired cutters the pencil has been driven which allows the level of sharpness to be further modified; Similarly, the wheel motor may be a step motor that moves the pencil an incremental distance depending on the desired level of sharpness.

Referring to FIGS. 4 and 5, a cutting mechanism is disposed in the housing 36 and adapted to sharpen the pencil 54 in the bore 14. The cutting mechanism is preferably configured to sharpen the pencil 54 to any one of a plurality of degrees of sharpness depending on the selectable control 18A, 18B, 18C. The cutting mechanism is preferably configured to secure the pencil 54 inserted in the bore 14, automatically advance the pencil 54 during the sharpening thereof, and then to at least partially eject the pencil 54 after sharpening. The cutting mechanism may include wheels 52 configured to secure the pencil 54 in the bore 14. The wheels 52 are preferably configured to transport the pencil 54 during the sharpening process and during ejection from the automatic pencil sharpener 10.

The pencil sharpener 10 preferably automatically secures a pencil 54 during the sharpening process to prevent a user from having to push the pencil 54 inwardly during sharpening. This automates the process and allows a user to simply load the pencil 54 and then attend to other matters.

Referring to FIG. 2, The sides of the sharpener housing 36 may flare generally outwardly when moving along the perimeter of the housing 36 generally upwardly away from the base 38 of the sharpener 10. Then, the housing 36 goes through a gentle arc to form the upper contour of the sharpener 10.

The sharpener 10 may include a touch sensitive sensor 40 that surrounds the bore 14 to determine when a user's finger is too close to the bore. The touch sensitive sensor preferably deactivates the pencil cutting operation when it detects a portion of a person's body.

Referring to FIG. 3, it is preferable that the side of the sharpener bends slightly inwardly to form a fold. The pencil shavings bin 48 may be able to extend from the rear 50 of the housing 36 to simplify the disposal of pencil shavings.

Referring to FIG. 4, one type of cutting mechanism that may be used with any embodiment of the pencil sharpener 10 of the present invention uses a single set of paired cutters 58 to sharpen pencils 54 to varying degrees of sharpness, as desired. It is preferable that wheels 52 are spring loaded to grasp a pencil 54 once it is inserted into the sharpener. The wheels may be formed of polymer or any suitable material. An electronic sensor may be used to determine when the pencil 54 is inserted into the bore 14. Three wheels 52 may be used to 'grasp' the pencil 54. At least one of the wheels 52 can be driven by a wheel motor 56 to adjust the pencil position. This allows the pencil 54 to be guided to the paired cutters 58 that for sharpening. While one structure has been described for securing a pencil 54 during a sharpening operation, those of ordinary skill in the art will appreciate from this disclosure that any suitable structure or method of securing the pencil 54 may be used without departing from the scope of the present invention.

Referring still to FIG. 4, a cutting motor 64 is preferably linked to the paired cutters 58 via gears 66, 62, and 60. The cutting motor 64 may be concentrically mounted with a cutting gear 66. The cutting gear 66 drives intermediate gear 62 which drives cutter gears 60 on the paired cutters 58.

A sensor 68 that uses multiple light beams 70 may be used to monitor how far into the paired cutters 58 the pencil 54 has been driven which allows the level of sharpness to be controlled. However, those of ordinary skill in the art will appreciate from this disclosure that any suitable type of sensor can be used without departing from the scope of the present invention. Alternatively, the wheel motor 56 may be a step motor that moves the pencil 54 an incremental distance depending on the desired level of sharpness.

The cutting mechanism may include a carousel 74 rotateably positioned within the housing 36 and supporting a plurality of paired cutters 72A, 72B, 72C. Each of the plurality of paired cutters 72A, 72B, 72C being configured to sharpen a pencil 54 to a different degree of sharpness. Referring to FIG. 5, another type of cutting mechanism that may be used with any embodiment of the pencil sharpener 10 of the present invention uses multiple sets of paired cutters 72A, 72B, and 72C to sharpen pencils 54 to varying degrees as desired. The paired cutters 72A, 72B, and 72C are preferably arranged in pairs on a carousel 74 and can each be configured to provide different degrees of sharpening. The carousel 74 may be driven by a carousel motor 76. The carousel 74 may align one of the plurality of paired cutters 72A, 72B, 72C with the bore 14 depending on the degree of sharpness selected via the selectable control(s) 18A, 18B, 18C.

The wheels 52 can guide the pencil 54 to the paired cutters 72A that are aligned under the wheels 52 by the carousel 74. While the carousel is shown as having three paired cutters 72A, 72B, and 72C, those of ordinary skill in the art will appreciate from this disclosure that any number of paired cutters can be used without departing from the scope of the present invention. For example, one, two, four or more paired cutters can be used by the cutter mechanism.

The cutting motor 64 may be linked to the paired cutters 72A, 72B, or 72C that will sharpen the pencil via gears 66, 62, 60. The cutting gear 66 drives the adjacent intermediate gear 62 which drives cutter gears 60 on the paired cutters 72A, 72B, or 72C. A sensor (not shown) that uses multiple light beams may also be used to monitor how far into the paired cutters the pencil 54 has been driven which allows the level of sharpness to be further modified. Similarly, the wheel motor 56 may be a step motor that moves the pencil 54 an incremental distance depending on the desired level of sharpness. While preferred embodiments of the cutting mechanism have been described above, those of ordinary skill in the art will appreciate from this disclosure that any suitable cutting mechanism, linkage arrangement or the like can be used without departing from the scope of the present invention. As such, the present invention includes using a single rotary cutter rather than a cutter pair without departing from the scope of the present invention.

Figure 6:
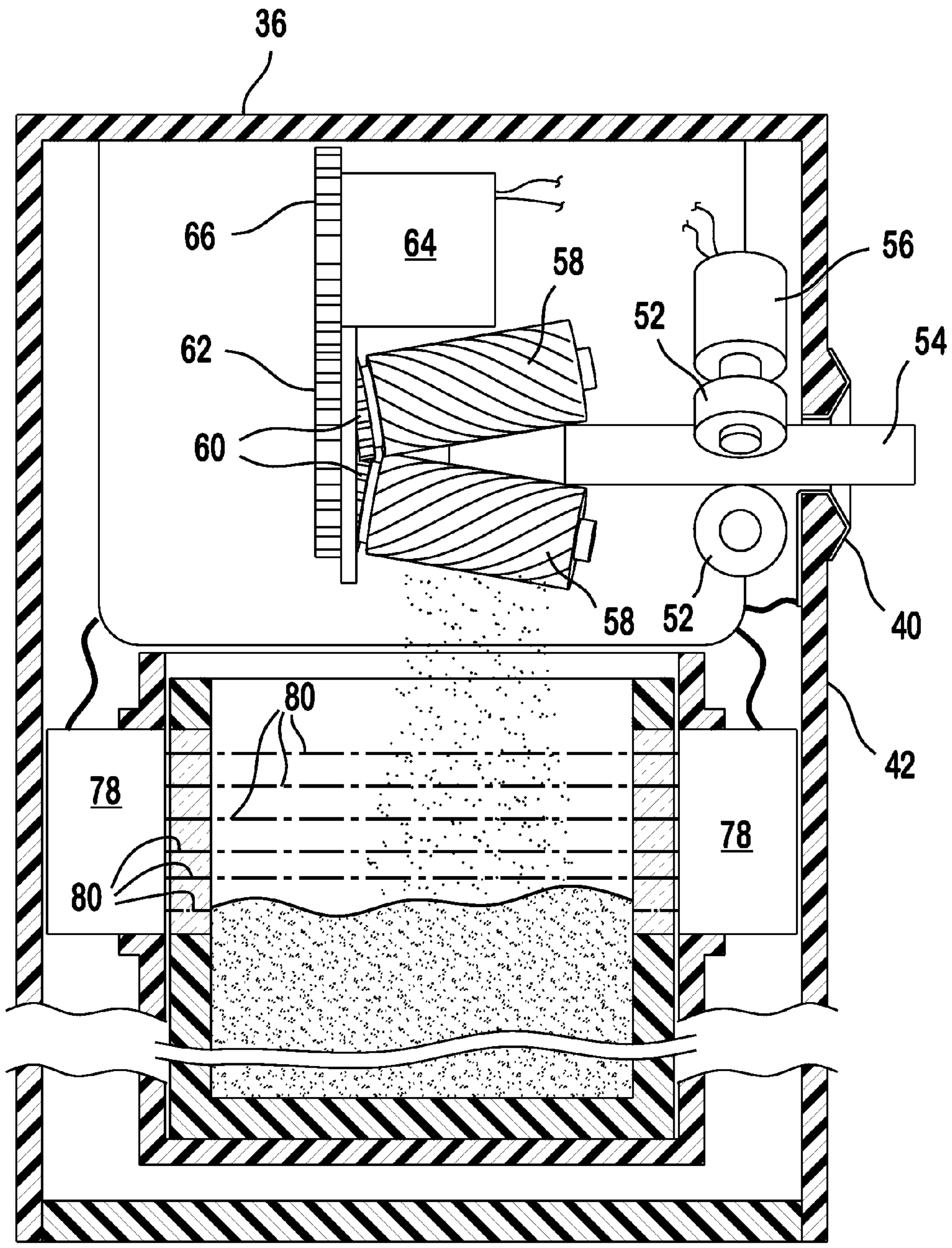
FIG. 6 is a cross-sectional view of a pencil sharpener similar to that illustrated in FIGS. 1 and 2 that shows one preferred method of determining the amount of pencil shavings that have accumulated in the pencil shavings bin; The pencil may be held in position by polymer wheels and driven toward a set of paired cutters; The cutter motor drives the paired cutters to sharpen the pencil; During the sharpening process pencil shavings may fall into the bin; The pencil shavings bin may include a sensor that comprises a horizontal light curtain; As the amount of pencil shavings in the bin increases, light beams that are positioned below the level of accumulated pencil shavings in the bin are interrupted. This provides a mechanism for the pencil sharpener to determine what amount of the pencil shavings bin capacity has been used.

Referring to FIG. 6, a cross-sectional view of a pencil sharpener 10 according to the present invention is shown and illustrates one preferred method of determining the amount of pencil shavings that have accumulated in the pencil shavings bin 48. As shown in the upper right portion of FIG. 6, the pencil 54 may be inserted inwardly into the pencil sharpener 10 and held in position by wheels 52. The wheels 52 may drive the pencil generally leftwardly into the paired cutters 58 which sharpen the pencil 54. The pencil shavings then fall generally downwardly from the pencil 54 and into the pencil shavings bin 48. It is preferred that a senor 78 which comprises a horizontal light curtain positions a number of light beams 80 at different heights in the bin 48. As the amount of pencil shavings in the bin 48 increase, light beams 80 that are at a lower height than the accumulated pencil shavings are interrupted. This provides a mechanism for the pencil sharpener 10 to determine what amount of the pencil shavings bin capacity has been used. While one preferred method of determining the fullness of the bin 48 has been disclosed, those of ordinary skill in the art will appreciate from this disclosure that any suitable method may be used without departing from the scope of the present invention. For example, the pencil sharpener may monitor weight to determine the amount of capacity remaining in the bin 48.

Figure 7:
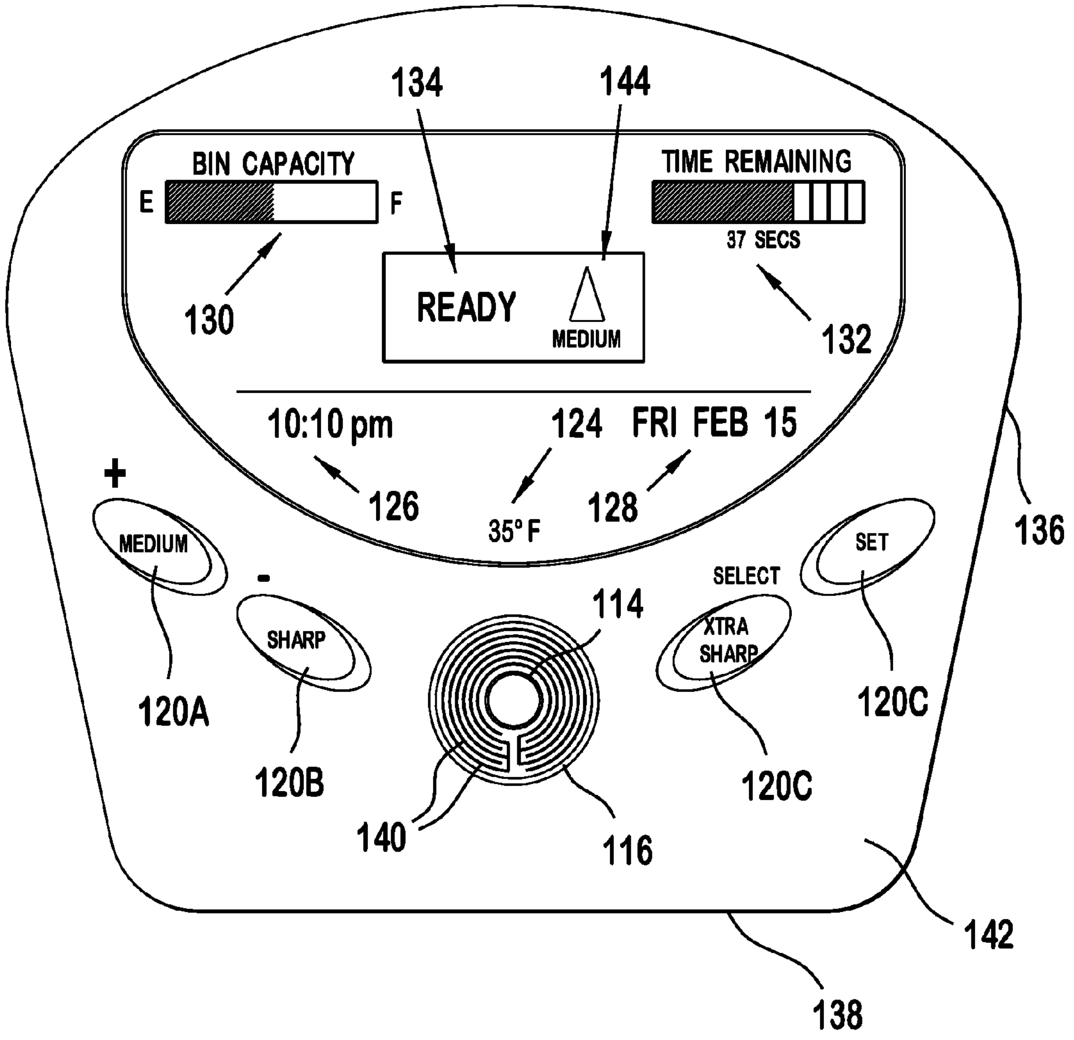
FIG. 7 is a front elevational view of a third preferred embodiment of the pencil sharpener according to the present invention; The sharpener may include a touch sensitive sensor that surrounds the bore to determine when a user's finger is too close to the bore; The touch sensor illustrated in this embodiment uses interspersed conductive layers; However, the pencil sharpener may use any suitable sensor without departing from the present invention; The touch sensitive sensor preferably deactivates the pencil sharpener cutting operation when it detects a portion of a person's body; A light may be located around the bore into which the pencil is loaded; This automates the process and allows a user to simply load the pencil and then attend to other matters.
Figure 8:
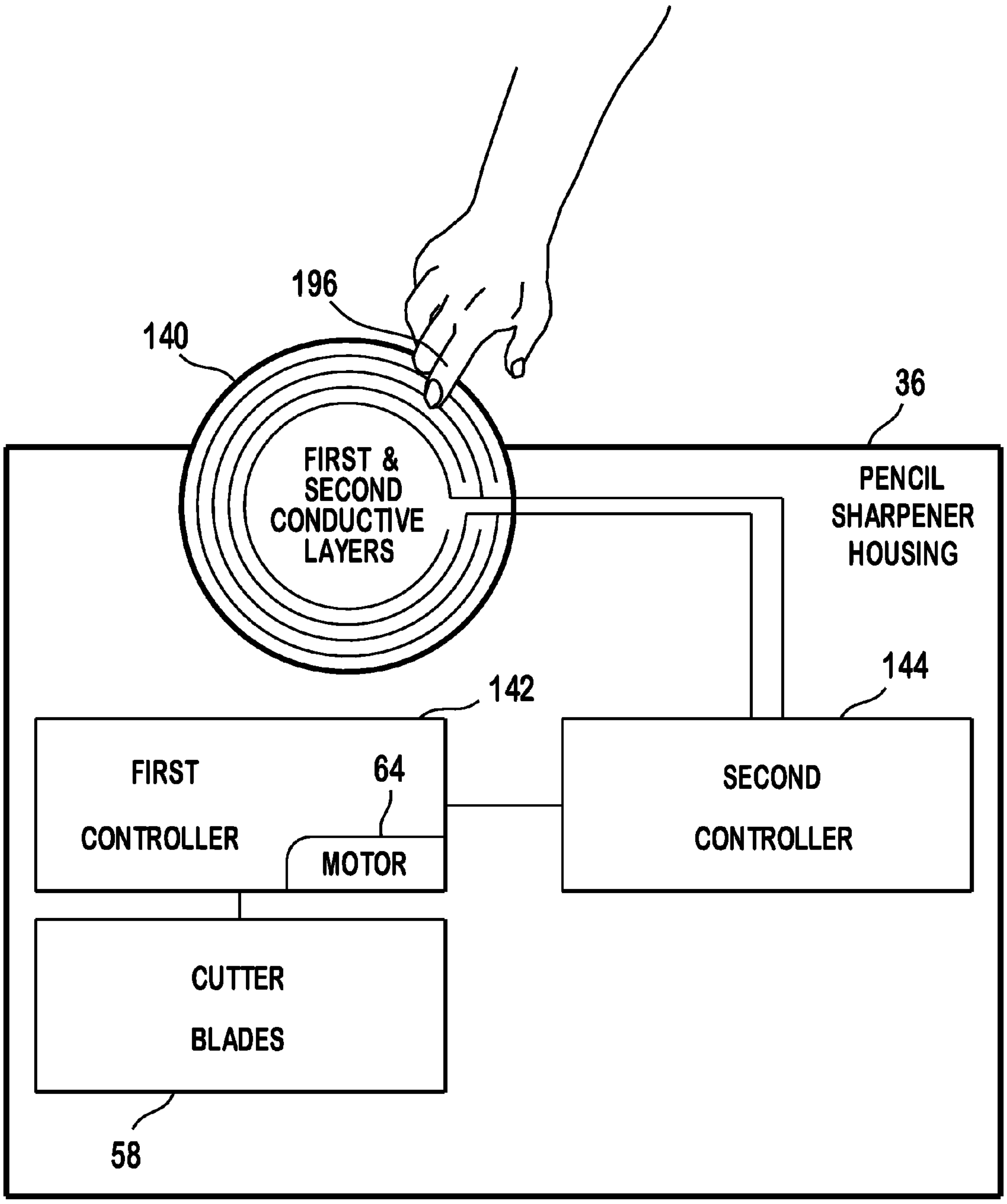
FIG. 8 is a block diagram of the pencil sharpener of FIG. 1.
Figure 9:
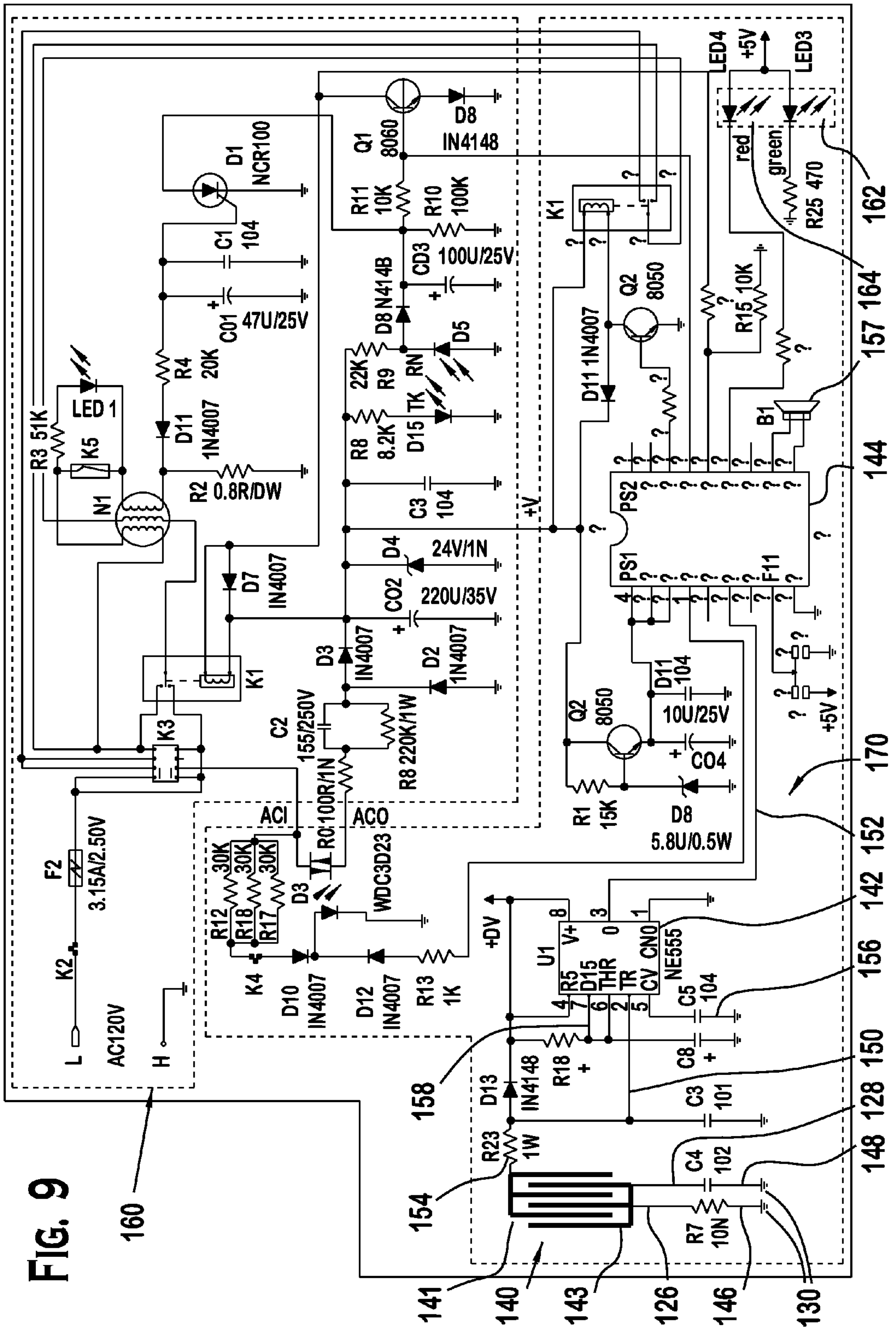
FIG. 9 is a circuit diagram of a preferred controller for a pencil sharpener.

Referring to FIGS. 7-9, touch detection circuitry 170 and sharpener control circuitry 160 is preferably disposed at least partially along and/or within the pencil sharpener housing 36. When the sharpener detects an inserted pencil 54, at least one of the touch detection circuitry and the sharpener control circuitry activates the cutting motor 64 to sharpen the pencil. It is preferred, that the cutters 58 rotate upon activation. However, vibratory movement, reciprocating movement, or any other suitable cutting movement can be used when the cutters 58 are activated.

Referring still to FIGS. 7-9, the sharpener 10 includes a first conductive layer 141 disposed on at least a portion of the outer surface 36 of the sharpener housing 36. Referring to FIGS. 7 and 8, it is preferable that the first conductive layer 141 is disposed on at least a portion of the inner surface of the walls of the bore 14 or along a portion of the housing 36 proximate to the bore 14.

As best shown in FIG. 9, the sharpener 10 may include a second conductive layer 143 disposed on at least a portion of the outer surface of the pencil sharpener housing. It is preferred, but not necessary, that the second conductive layer 143 is separated from the first conductive layer 141. However, those of ordinary skill in the art will appreciate from this disclosure that the locations of the first and second conductive layers 141, 143 can be varied in location or area without departing from the scope of the present invention.

Referring specifically to FIG. 7, it is preferred that the first and second conductive layers 141, 143 are interspaced in a fingered format so that both the first and second conductive layers 141, 143 can be contacted by a single finger touching just one and/or both of the conductive layers or one area of the sharpener housing 36. The sharpener 10 can also be configured to allow a user to selectively activate the fingers of the first and second conductive layers 141, 143 so that they can either be intermeshed in one area or located in separate areas. By selecting how to activate the conductive layers 141, 143, a user can alter the sensitivity of the sharpener 10 and how quickly it will deactivate the cutters 58.

The first and second conductive layers 141, 143 are preferably only as thick as necessary for reliable electrical communication. However, those of ordinary skill in the art will appreciate from this disclosure that the conductive layers 141, 143 can be of any thickness or can extend through the entire thickness of the sharpener housing 36 without departing from the scope of the present invention.

Referring to FIG. 8, while first and second controllers 142, 144 are described below, those of ordinary skill in the art will appreciate from this disclosure that a single controller be used to operate the sharpener 10 of the present invention without departing from the scope of the present invention. The first controller 144 is preferably formed by an integrated circuit or any other suitable control mechanism. The first controller 144 is preferably in communication with the sharpener 10 and is adapted to cause the cutters 58 to deactivate when certain conditions are met.

A second controller 142 is preferably in communication with at least one of the first and second conductive layers 141, 143. When a portion of a person's body 136 touches both the first and second conductive layers 141, 143, the second controller 142 is adapted to send a signal to the first controller 144. The controller 142, 144 (a single controller may serve the function of the two controllers 142, 144) is preferably in communication with the cutting mechanism and is adapted to determine when a portion of a person's body is touching a portion of the housing 36 proximate the bore 14. The controller 142, 144 preferably stops the cutting mechanism when a portion of a person's body is detected to prevent injury. When the first controller 144 receives the signal, the first controller 144 deactivates the cutters 58. The second controller can preferably differentiate between the capacitance of a human and when a metallic and/or magnetic object contacts both of the first and second conductive layers 141, 143.

Referring to FIG. 9, the illustrated schematic is exemplary only. Those of ordinary skill in the art will appreciate from this disclosure that any suitable circuit(s) can be used without departing from the scope of the present invention. In the preferred circuitry, when a portion of the person's body 136 is not in contact with both the interspaced first and second conductive layers 140, the condition of the conductive layers 141, 143 is constant. During this time, the second controller's 142 second pin is activated in a high electric level (bigger then ⅔ Voltage Drain Drain). The second controller 142 sends a signal via the second controller's third pin 152 output to the first controller 144. The signal can be a high, low, or a zero voltage signal as desired. The first controller 144 maintains the sharpener 10 in normal operating condition while receiving the appropriate signal from the second controller 142.

During sharpener operations, when a portion of a person's body 136 touches both the conductive layers 141, 143, the capacitance of the person's body 136 is connected with a high resistance resistor 146. This results in an interference signal detected capacitor 148 and resistor 146. Since, at the moment conductive layers 141, 143 are touched, the second pin of the second controller 142 has a high input resistance, human capacitance, resistor 146, and resistor 154 are linked through the conductions layers 141, 143 and the person's body which divides the voltage. A touch-off voltage is then filtered by capacitor 148. This results in a very low voltage level being provided to the second pin of the second controller 142. This causes the second controller 142 to send a signal to the first controller 144 which causes the first controller 144 to shut down (i.e., stop the rotation of or otherwise deactivate) the cutters 58.

The second controller 142 is preferably an integrated circuit that is in communication with the first conductive layer 141. The second conductive layer 143 preferably has first and second electrical pathways 126, 128 each leading to a ground 130. The first electrical pathway 126 includes a resistor 146 and the second electrical pathway 128 includes a capacitor 148. It is understood that any suitable circuitry can be used with the sharpener of the present invention without departing from the scope of the present invention.

The first and second controllers 144, 142 are preferably configured to deactivate the cutters 58 until the portion of the person's body 136 stops contacting both the first and second conductive layers 141, 143. The first controller 144 may activate a warning light 121 while the portion of the person's body 136 touches both of the first and second conductive layers 141, 143. The warning light may include multiple light emitting diodes 162, 164 that each emit a different color light. It is preferred that the diodes 162, 164 combine to cause the warning light 121 to emit a generally yellow light when activated. The sharpener may also includes a speaker 157 electrically connected to the first controller 144. The first controller 144 may activate the speaker 157 to emit a warning sound when the portion of the person's body 136 contacts the first and second conductive layers 141, 143. When contact between a person's body 136 and the conductive layers 141, 143 is brief, then the sharpener 10 can be stopped for a brief period such as three seconds while an alarm and warning light are activated. The length of the pause in the sharpener 10 operation can be varied as desired.

It is preferable that if the portion of the person's body stays in contact with both the first and second conductive layers 141, 143 for a predetermined amount of time, that the first controller 144 is configured to turn off the sharpener. It is preferred that the predetermined amount of time is less than or equal to thirty seconds. It is more preferable still that the predetermined amount of time is less than or equal to 3 seconds.

The present invention also includes methods of automatically sharpening pencils. The steps of the method need not be performed in the recited order. The methods of the present invention preferably use the sharpener 10 described above. However, the methods of the present invention may operate with pencil sharpeners having fewer or different components from those described above.

One preferred method of automatically sharpening a pencil according to the present invention includes providing a housing 36 defining a bore 14 adapted to receive the pencil 54 for automatic sharpening. A degree of sharpness to which to sharpen the pencil may be selected. The method may include inserting the pencil 54 into the bore 14.

The pencil may be automatically advanced without requiring manual manipulation to sharpen the pencil. The pencil may be automatically sharpening to one of a plurality of degrees of sharpness. The pencil can be automatically at least partially ejected after the completion of the sharpening operation.

The method of the present invention may include monitoring the housing 36 proximate to the bore for contact by a portion of a person's body 136 and deactivating the cutting mechanism to prevent injury if a portion of a person's body 136 is detected. The method may include indicating at least one of the status of the sharpening operation and the time remaining for completion of the sharpening operation.

A second preferred method of automatically sharpening a pencil according to the present invention may include providing a housing 36 defining a bore 14 adapted to receive the pencil 54 for automatic sharpening. The method may include automatically monitoring the housing 36 proximate the bore 14 to detect a portion of a person's body 136 and stopping the sharpening operation to prevent injury if the portion of the person's body 136 is detected.

The method may, but does not necessarily, include: inserting the pencil into the bore; automatically advancing the pencil without requiring manual manipulation to sharpen the pencil; automatically sharpening the pencil to one of a plurality of degrees of sharpness; and automatically at least partially ejecting the pencil after the completion of the sharpening operation.

Stopping the sharpening operation may include at least partially ejecting the pencil located in the bore to facilitate the portion of the person's body from being caught in the bore.

It is recognized by those skilled in the art that changes may be made to the above described pencil sharpener 10 without departing from the broad inventive concept thereof. It is understood, therefore, that this invention is not limited to the particular embodiments disclosed, but is intended cover all modifications which are within the spirit and scope of the invention as defined by the above specification, the appended claims and/or shown in the attached drawings.

What is claimed is:

1. A method of automatically sharpening a pencil, comprising:

providing a housing defining a bore adapted to receive the pencil for automatic sharpening; and automatically monitoring the housing proximate the bore to detect a portion of a person's body and stopping the sharpening operation to prevent injury if the portion of the person's body is detected.

2. The method of claim 1, further comprising:

inserting the pencil into the bore;

automatically advancing the pencil without requiring manual manipulation to sharpen the pencil;

automatically sharpening the pencil to one of a plurality of degrees of sharpness; and automatically at least partially ejecting the pencil after the completion of the sharpening operation.

3. The method of claim 1, wherein the step of stopping the sharpening operation further comprises at least partially ejecting the pencil located in the bore to facilitate the portion of the person's body from being caught in the bore.

4. A method of automatically sharpening a pencil, comprising:

providing a housing defining a bore adapted to receive the pencil for automatic sharpening; and automatically monitoring the housing proximate the bore to detect a portion of a person's body as the portion begins to enter the bore and stopping the sharpening operation to prevent injury if the portion of the person's body is detected.

5. The method of claim 4, further comprising:

inserting the pencil into the bore;

automatically advancing the pencil without requiring manual manipulation to sharpen the pencil;

automatically sharpening the pencil to one of a plurality of degrees of sharpness; and automatically at least partially ejecting the pencil after the completion of the sharpening operation.

6. The method of claim 4, wherein the step of stopping the sharpening operation further comprises at least partially ejecting the pencil located in the bore to facilitate the portion of the person's body from being caught in the bore.

7. A method of automatically sharpening a pencil, comprising:

providing a housing defining a bore adapted to receive the pencil for automatic sharpening; and automatically monitoring the housing around the bore to detect a portion of a person's body as the portion approaches the bore and stopping the sharpening operation to prevent injury if the portion of the person's body is detected.

8. The method of claim 7, further comprising:

inserting the pencil into the bore;

automatically advancing the pencil without requiring manual manipulation to sharpen the pencil;

automatically sharpening the pencil to one of a plurality of degrees of sharpness; and automatically at least partially ejecting the pencil after the completion of the sharpening operation.

9. The method of claim 7, wherein the step of stopping the sharpening operation further comprises at least partially ejecting the pencil located in the bore to facilitate the portion of the person's body from being caught in the bore.

* * * * *